United States Patent [19]

Rupprecht

[11] Patent Number: 4,665,685
[45] Date of Patent: May 19, 1987

[54] CUTTING TROUGH UNIT FOR AGRICULTURAL MACHINES WITH FLEXIBLE CUTTING MECHANISM

[75] Inventor: Karl Rupprecht, Hilter, Fed. Rep. of Germany

[73] Assignee: Claas OHG, Harsewinkel, Fed. Rep. of Germany

[21] Appl. No.: 796,393

[22] Filed: Nov. 7, 1985

[30] Foreign Application Priority Data

Nov. 10, 1984 [DE] Fed. Rep. of Germany ....... 3441209

[51] Int. Cl.$^4$ ..................... A01D 34/02; A01D 34/24
[52] U.S. Cl. ........................................ 56/208; 56/15.8
[58] Field of Search ................ 56/208, 314, 15.8, 210, 56/319, 17.2

[56] References Cited

U.S. PATENT DOCUMENTS

| | | | |
|---|---|---|---|
| 3,021,660 | 2/1962 | Huseman | 56/210 |
| 3,168,800 | 2/1965 | Dyrdahl | 56/210 |
| 3,842,575 | 10/1974 | Cicci et al. | 56/210 |
| 4,011,709 | 3/1977 | Mott et al. | 56/208 |
| 4,407,110 | 10/1983 | McIlwain et al. | 56/15.8 |
| 4,414,793 | 11/1983 | Halls | 56/15.8 |
| 4,473,993 | 10/1984 | Jennings et al. | 56/208 |
| 4,599,852 | 7/1986 | Kerber et al. | 56/15.8 |

FOREIGN PATENT DOCUMENTS 2550249 9/1981 Fed. Rep. of Germany .

*Primary Examiner*—Paul J. Hirsch
*Attorney, Agent, or Firm*—Michael J. Striker

[57] ABSTRACT

A cutting trough unit for a self-propelled agricultural machine comprises a cutting trough; cutting means arranged flexibly relative to the cutting trough so as to follow a ground contour within a certain limit a plurality of sliding skids are articulately connected with the cutting trough and a connection for articulately connecting the sliding skids with the cutting trough and including a lower supporting arm and an upper supporting arm extending in a traveling direction, the lower supporting arm having a first end articulately connected with the cutting trough and a second end connected with the sliding skid, the upper supporting arm having a first end articulately connected with the cutting trough and a second end displaceably articulately connected with the lower supporting arm, the supporting arms and the sliding skids being fixedly connected with one another.

7 Claims, 4 Drawing Figures

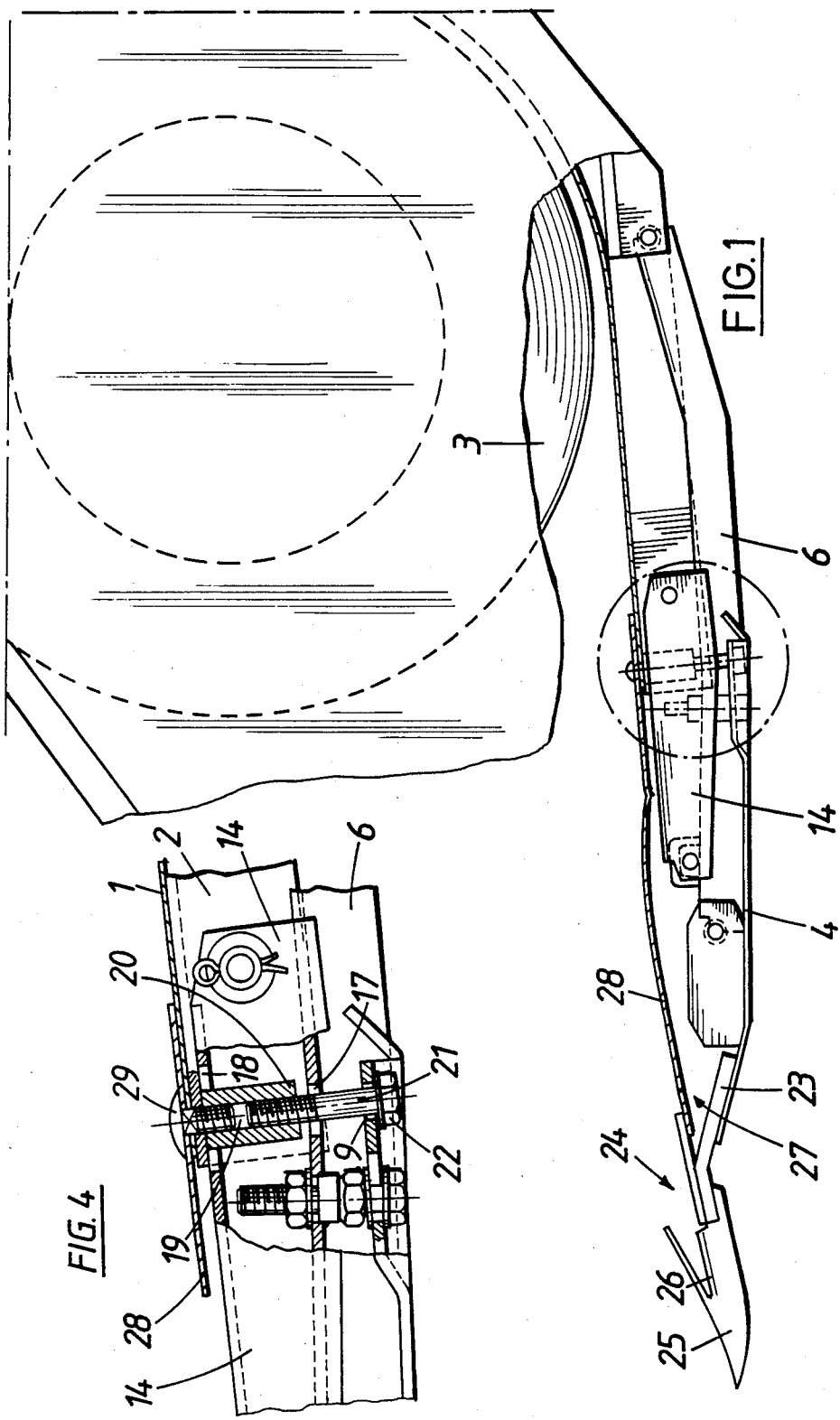

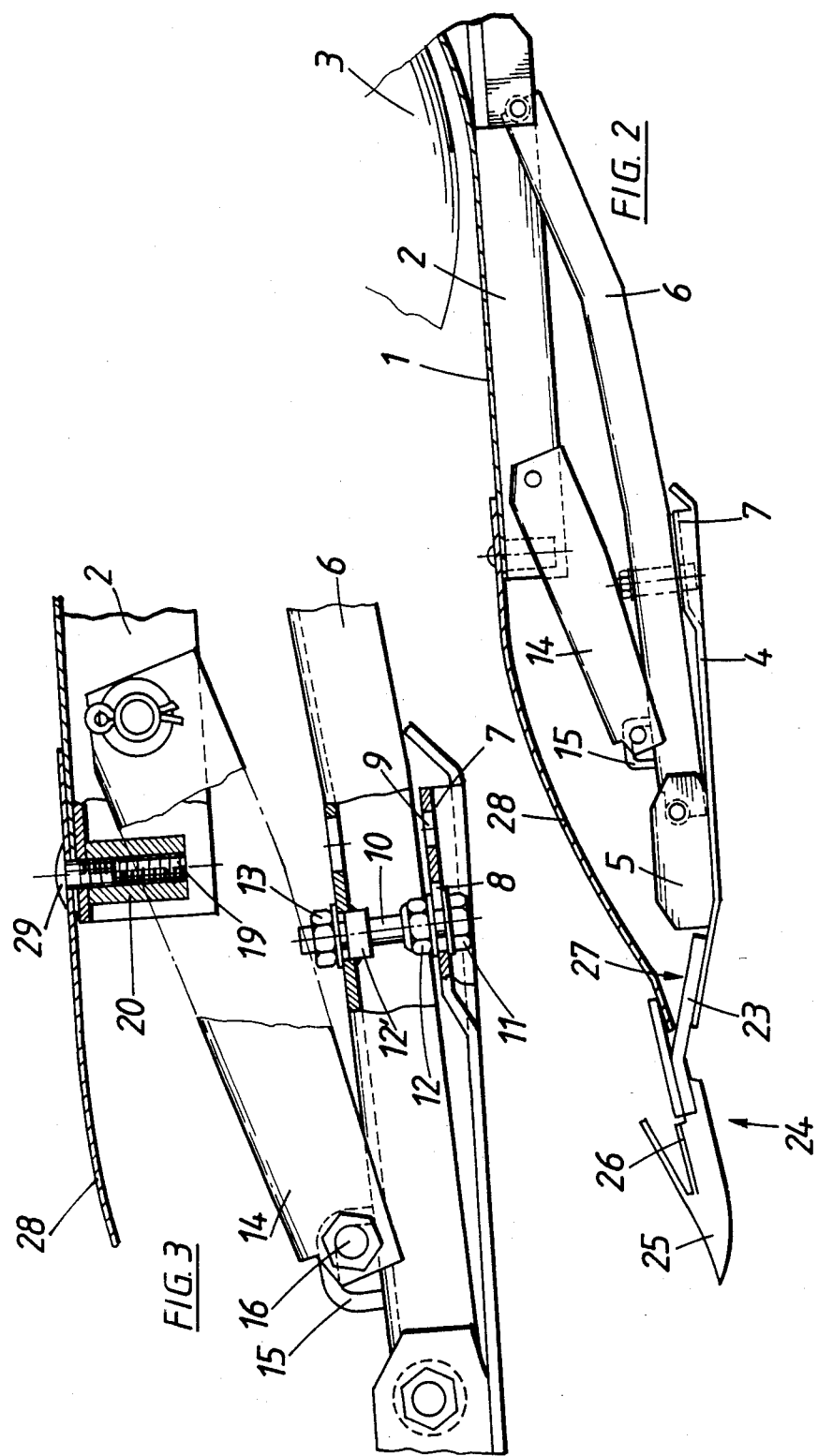

CUTTING TROUGH UNIT FOR AGRICULTURAL MACHINES WITH FLEXIBLE CUTTING MECHANISM

BACKGROUND OF THE INVENTION

The present invention relates to a cutting trough unit for self-propelled agricultural machines with a cutting mechanism which is flexible relative to a cutting trough so as to follow a ground contour within certain limits.

Cutting trough units of the above mentioned general type are known in the art. The cutting mechanism generally includes a plurality of sliding skids arranged near one another, and supporting arms which extend in a traveling direction and pivotally mount the sliding skids on the cutting trough. The cutting mechanism includes mowing fingers which are connected with the skids and together with a mowing cutter form so-called mowing bars. A spring sheet overlaps the distance between the mowing bars and the cutting trough.

One of such cutting trough units is disclosed, for example, in the DE-OS No. 2,550,249. It is used for harvesting of certain predetermined products, for example soy beans. For harvesting other agricultural products, for example rye and barley, cutting trough units with rigid cutting mechanisms are advantageous. For a harvester thresher which must be used both for harvesting soy beans and the like, as well as for harvesting of barley and the like, two cutting trough units must be provided.

SUMMARY OF THE INVENTION

Accordingly, it is an object of the present invention to provide a cutting trough unit which avoids the disadvantages of the prior art.

More particularly, it is an object of the present invention to provide a cutting trough unit which is formed so that it can be used anywhere selling for different agricultural products.

In keeping with these objects and with others which become apparent hereinafter, one feature of the present invention resides, briefly stated in a cutting trough unit in which a lower supporting arm is articulately connected with a cutting trough and is connected with a sliding skid, an upper supporting unit is articulately connected at its one end with the cutting trough and at its other end with the lower supporting arm displaceably relative to the latter, and both supporting arms are rigidly connected with one another.

When the cutting trough unit is formed in accordance with the present invention, it is possible to use the same cutting mechanism for cutting different fruit types for example soy beans or rye, wherein a flexibly formed cutting mechanism on the one hand and a rigid cutting mechanism on the other hand is of advantage.

In accordance with another advantageous feature of the present invention which provides for a simple construction, a threaded sleeve is screwingly clamped with a rigid part of the cutting trough, and both supporting arms as well as the sliding skid are provided with through openings which are in alignment with an opening of the threaded sleeve in condition of lifted mowing bars.

In accordance with another feature of the present invention, a mounting screw is screwed into one side of the threaded sleeve so as to connect a spring sheet with the cutting trough, and an arresting screw is screwed in the other end of the threaded sleeve and through the openings of supporting arms and the sliding skid.

For providing different adjustment of the sliding skid relative to the ground if necessary, the sliding skid is mounted on the lower supporting arm in an angularly adjustable manner.

In accordance with still a further important feature of the present invention, the lower supporting arm is connected with its one end pivotally and is further connected at a distance from the pivotal connection point with the sliding skid by an adjusting screw.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is a side view showing a front part of a cutting mechanism trough with lifted mowing bars;

FIG. 2 is a view showing a part of FIG. 1 with lowered mowing bars;

FIG. 3 is a view showing a section of FIG. 2 on an enlarged scale; and

FIG. 4 is a view showing a region of FIG. 1, encircled by dash-dot lines, on an enlarged scale.

DESCRIPTION OF A PREFERRED EMBODIMENT

A cutting trough unit of a harvester thresher in accordance with the present invention has a cutting trough which is identified with reference numeral 1 and is provided at its lower side with a plurality of reinforcing supports 2 which are arranged near one another. A driveable drawing conveyor screw 3 is supported in a known manner on the cutting trough.

The cutting trough 1 is provided in its front region with a plurality of sliding skids which are arranged near one another. These sliding skids are liftable and lowerable within a certain range independently of one another. Since mounting of all sliding skids on the cutting trough 1 is performed in a similar manner, the mounting of only one skid will be described herein below in detail. As can be seen from FIG. 2 a console 5 is welded with the sliding skid 4. An end of a first supporting arm 6 is articulately connected with the console 5. The other end of the supporting arm 6 is articulately connected with the supports 2. The sliding skid 4 has a depression 7 located at a distance from the pivotal connection between the first supporting arm 6 and console 5. The wall of the depression 7 has two through openings 8 and 9 which are arranged near one another as shown in FIG. 3. A screw 10 extends through the opening 8. A head 11 of the screw 10 abuts from below against the wall of the depression 7. The screw 10 has a diameter which is smaller than the diameter of the opening 8.

A self-locking nut 12 is screwed on the screw so that the nut 12 and the head 11 receive therebetween the wall of the depression 7 with a small play. The end of the screw 10 extends through a welded nut 12' which is welded with the first supporting arm 6. The end region of the screw 10 is secured by means of a counter nut 13.

Depending on the depth of screwing of the screw 10 through the welded nut 20', the angular position of the sliding skid 4 relative to the lower supporting arm 6 changes. In each of selected angular positions the skid 4 with the supporting arm 6 is displaceable, but is also arrestable in its selected position.

As can be seen from FIGS. 1 and 2, a second supporting arm 14 is provided. One end of the supporting arm 14 is articulately connected with the support 2, whereas the other end of the supporting arm 14 is articulately connected with the first supporting arm 6 and is additionally displaceable relative to the latter. For this purpose a bracket 15 is welded on the upper surface of the supporting arm 6, and a pin 16 which is supported in both free legs of the second supporting arm 14 is displaceably guided in the bracket 15.

As can be seen from FIG. 4, both supporting arms 6 and 14 are provided with through openings 17 and 18. These openings are in alignment with an opening 9 provided in the sliding skid 4. In the extended position of the supporting arm 6 and 4 shown in FIGS. 1 and 4, these openings are also in alignment with a threaded opening 19 of a threaded sleeve 20. The threaded sleeve 20 is threadingly clamped by means of a screw 29 with the cutting trough, for example with the support 2 which reinforces the cutting trough 1.

A screw 21 extends through the openings 9 and 17 and is screwed into the threaded sleeve 20. A screw head 22 of the screw 20 abuts against the wall of the depression 7 from below and firmly clamps the supporting arms 6 and 14 with one another. Thereby a movement of the skid 4 relative to the cutting trough 1 is prevented. The diameter of the opening 18 is greater than the outer diameter of the threaded sleeve 20, and the diameter of the opening 17 is greater than the diameter of a shaft of the screw 21 so that, regardless of the angular position of the skid 4 relative to the lower supporting arm 6, screwing of the arresting screw 21 into the threaded sleeve 20 is possible.

As shown in FIGS. 1 and 2, a holder 23 is welded to each skid 4. A through going cutting bar 24 is connected with the holder 23 by screws in a not shown manner. The cutting bar 24 is composed substantially of fingers 25 and a mowing cutter 26.

Each holder 23 forms an angle 27 relative to the cutting bar 24. A spring sheet 28 has an end inserted into the angular space of the angle 27 and has a length corresponding to the length of the cutting bar 24. The other end of the spring sheet 28 is firmly connected with the cutting trough 1 by a screw 29. The threaded sleeve 20 serves, therefore, both for receiving the screw 29 and for receiving of the screw 21.

It will be understood that each of the elements described above, or two or more together, may also find a useful application in other types of constructions differing from the types described above.

While the invention has been illustrated and described as embodied in a cutting trough unit of an agricultural machine, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A cutting trough unit for a self-propelled agricultural machine, comprising a cutting trough; cutting means arranged flexibly relative to said cutting trough so as to follow a ground contour within a certain limit; a plurality of sliding skids articulately connected with said cutting trough; and means for articulately connecting said sliding skids with said cutting trough and including a lower supporting arm and an upper supporting arm extending in a traveling direction, said lower supporting arm having a first end articulately connected with said cutting trough and a second end connected with said sliding skid, said upper supporting arm having a first end articulately connected with said cutting trough and a second end displaceably articulately connected with said lower supporting arm, said supporting arms and said sliding skids being fixedly connected with one another.

2. A cutting trough unit as defined in claim 1, wherein said cutting means includes a plurality of cutting bars each having a plurality of fingers and a mowing cutter.

3. A cutting trough unit as defined in claim 2, wherein said cutting bars are spaced from said cutting trough by a predetermined distance; and further comprising a spring sheet which covers said distance between said cutting bars and said cutting trough.

4. A cutting trough unit as defined in claim 1, wherein said cutting trough has a rigid part; and further comprising a threaded sleeve connected with said rigid part of said cutting trough and having an opening, said supporting arms and said sliding skids each having a through opening which are in alignment with said opening of the threaded sleeve in a lifted condition of said cutting means.

5. A cutting trough unit as defined in claim 4, wherein said cutting means is spaced from said cutting trough by a predetermined distance; and further comprising a spring sheet covering said distance between said cutting means and said cutting trough, and a mounting screw which is screwed from one axial side of said threaded sleeve so as to connect said spring sheet with said cutting trough, and an arresting screw which is screwed from the other side of said threaded sleeve and through said openings of said supporting arms and said sliding skid.

6. A cutting trough unit as defined in claim 1, wherein said sliding skid is mounted in an angularly displaceable manner on said lower supporting arm.

7. A cutting trough unit as defined in claim 1, wherein said lower supporting arm is connected with said cutting trough in a predetermined point, said lower supporting arm being also connected with said sliding skid at a distance from said point; and further comprising means for connecting additionally said lower supporting arm at a distance from said point and including an adjusting screw.

* * * * *